US007379312B2

(12) United States Patent
Baptiste et al.

(10) Patent No.: US 7,379,312 B2
(45) Date of Patent: May 27, 2008

(54) HIGH-VOLTAGE DEVICE HAVING A MEASURING RESISTOR

(75) Inventors: Georges William Baptiste, Buc (FR); Denis Perillat-Amede, Paris (FR); Laurence Abonneau, Choisel (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 230 days.

(21) Appl. No.: 10/915,494

(22) Filed: Aug. 10, 2004

(65) Prior Publication Data

US 2005/0036344 A1 Feb. 17, 2005

(30) Foreign Application Priority Data

Aug. 14, 2003 (FR) .................................. 03 50434

(51) Int. Cl.
*H02M 3/06* (2006.01)
*G05F 3/16* (2006.01)

(52) U.S. Cl. ........................ 363/59; 363/144; 363/147; 323/229; 323/353; 323/370

(58) Field of Classification Search ............ 363/59–61, 363/144, 145, 147; 338/245, 258, 260, 320; 361/738, 763, 766, 821, 830; 323/229, 233, 323/352, 353, 369, 370
See application file for complete search history.

(56) References Cited

U.S. PATENT DOCUMENTS 1,974,328 A * 9/1934 Bouwers ...................... 363/59
2,369,772 A * 2/1945 Bouwers ...................... 363/59
3,398,326 A * 8/1968 Swart et al. ................ 361/795
3,902,108 A * 8/1975 Sion ............................ 363/61
4,167,035 A * 9/1979 Willard ....................... 363/60
4,870,746 A * 10/1989 Klaser ........................ 29/620
5,008,913 A 4/1991 Negele
5,408,236 A 4/1995 Freiheit-Jensen et al.
5,754,417 A * 5/1998 Nicollini ..................... 363/60
5,818,706 A 10/1998 Wimmer
6,721,152 B2 * 4/2004 Ho ............................ 361/93.9

FOREIGN PATENT DOCUMENTS

DE 596 313 C 5/1934
DE 37 14 945 A 11/1987
DE 44 36 305 A 4/1996
DE 198 41 164 A 3/2000

* cited by examiner

*Primary Examiner*—Gary L. Laxton
(74) *Attorney, Agent, or Firm*—Cantor Colburn LLP

(57) ABSTRACT

A high-voltage device having a measuring resistor, also called a bleeder, is plunged into an electrical field whose voltage varies in the same way as the voltage along the bleeder. To achieve this, the capacitive elements are distributed in two rows, each row defining a plane. Along each row, the potentials are growing. The space between the two rows is sufficient for the bleeder to be placed therein. The bleeder is formed either by series-connected resistors or by a screen-printed resistor.

43 Claims, 8 Drawing Sheets

HIGH-VOLTAGE DEVICE HAVING A MEASURING RESISTOR

CROSS-REFERENCE TO RELATED APPLICATIONS

This application claims the benefit of a priority under 35 USC 119(a)-(d) to French Patent Application No. 03 50434 filed Aug. 14, 2003, the entire contents of which are hereby incorporated by reference.

BACKGROUND OF THE INVENTION

An embodiment of the invention is directed to a high-voltage device comprising an internal measuring resistor. The field of the invention is related to generation of high voltages and instruments or an apparatus using these high voltages. In particular, the field of the invention is directed to medical apparatuses for the acquisition of radiological images such as X-ray images.

In the prior art, generation of X-rays for medical image acquisition requires a power supply voltage, between the anode and the cathode of the X-ray tube, ranging from 40 kV (kilo-volts) to more than 160 kV. This voltage is generally obtained with a bipolar device that applies two high voltages that are symmetrical relative to ground. In other words, to have 160 kV between the anode and the cathode, a device that generates +80 kV at the anode and −80 kV at the cathode is used. Controlling the sum of the two high voltages, namely the positive and negative high voltages, applied to the anode and the cathode, generally regulates this high voltage. Two identical devices that divide the voltage measured in a ratio of about 10,000, which is generally 1V for 10 kV, measure the two high voltages. To work well in oil at voltages of about 100 kilo-volts, a measurement device of this kind must have a maximum spacing between two conductive plates of about 40 mm (millimeter).

However, considerations of X-ray image quality have led to the connecting of the anode to the envelope of the tube which is itself ground-connected and to the application of all the voltage to the cathode alone. The power supply for the tube is no longer a bipolar (+ and −80 kV) supply but a one-pole (−160 kV) supply. The high-voltage generator now delivers only one voltage that, however, is twice the value of the voltage in the prior art. This has repercussions on the measurement device. If it were desired to keep the same measurement device, then, to keep the insulation, each of the dimensions would also need to be increased by a factor of two. The volume of the measurement device would then be increased eightfold. This would then raise many problems. One of these problems is related to the space requirement of the measurement device that would become incompatible with the manufacture of a compact apparatus, especially in the case of a mobile apparatus.

U.S. Pat. No. 5,818,706 discloses a high-voltage generator can be obtained by the serial association of several voltage rectifier stages. In order to measure the high voltage produced, a bleeder is parallel connected to the series of rectifiers. The bleeder has as many resistors as it has rectifier stages. Each resistor of the bleeder is associated with a rectifier stage. Each resistor also has an associated shielding cover, this shielding cover being connected to a potential existing at the output of the rectifier stage with which the resistor is associated. The device of U.S. Pat. No. 5,818,706 has several drawbacks as a result of the shielding, including space requirement, metal for the shielding giving rise to electrical arcing, and parasitic capacitances.

BRIEF DESCRIPTION OF THE INVENTION

An embodiment of the invention is a high-voltage device in which capacitors of filtering circuits of the rectifiers and their wiring are arranged in such a way that, around the measuring resistor, also called a bleeder, they generate an electrical field for which the development of the potential is similar to the one generated during steady operation by the resistor alone.

In an embodiment of the invention, one arrangement comprises distributing the capacitors of the rectifiers into parallel rows, each row defining a plane. The space between the two rows is sufficient for the bleeder to be placed thereon. The electrical wiring of the capacitors is such that, between the two rows, the potential increases all along the row in a manner similar to the internal potential of the bleeder. The bleeder comprises either of series-connected resistors or a resistor screen-printed on a plate.

An embodiment of the invention is a high-voltage device comprising several capacitors and at least one internal resistor for the measurement of high voltage, wherein the capacitors are aligned so as to form at least two parallel planes, and the measuring resistor is distributed between these two planes.

BRIEF DESCRIPTION OF THE DRAWINGS

An embodiment of the invention will be understood more clearly from the following description and the accompanying figures. These figures are given purely by way of an indication and in no way restrict the scope of the invention. Of these figures.

DETAILED DESCRIPTION OF THE INVENTION

Figure 1:
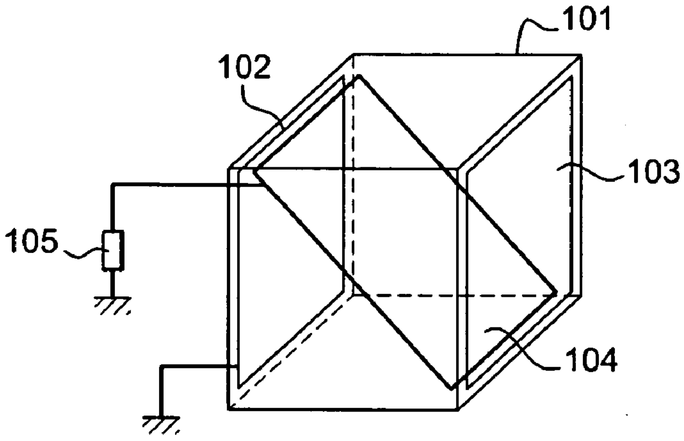
FIG. 1 is a prior art measuring device.

A known device is shown in FIG. 1. The device is immersed in an insulating fluid that is generally oil. A parallelepiped-shaped box 101 is made of an insulating material comprising two conductive plates 102 and 103, each located on an opposite face of the box 101. Between the plates 102 and 103 a flat resistor 104 is positioned diagonally. This is a resistor with a high value, in the range of some hundreds of MΩ (mega ohms). One end (104*b*) of this resistor (also called a high-voltage measuring bleeder resistor or bleeder) is connected to the high voltage to be measured while the other end (104*a*) is connected to a resistor 105 with a value of some tens of kΩ (also called a foot bleeder resistor). The electrical connection can be made with a wire (sheathed) and the resistor 105 located at a distance (outside the oil for example).

Through this bleeder, which is also connected to a bleeder foot resistor 105, a voltage divider bridge is formed. The voltage at the terminal of the resistor 105 is then a portion (1/10000) of the high voltage to be measured.

The conductive plate 102 is grounded (to the reference voltage) and the conductive plate 103 is connected to the high voltage to be measured, and this has the effect of producing an electrical field between the plates 102 and 103. The bleeder 104 is immersed in the field. The geometrical arrangement of this assembly has the effect of eliminating the effects of the parasitic capacitances distributed all along the bleeder with the high voltage and with the ground potential. Thus, the measurement is not distorted in terms of dynamic range by its parasitic capacitance values.

Figure 2:
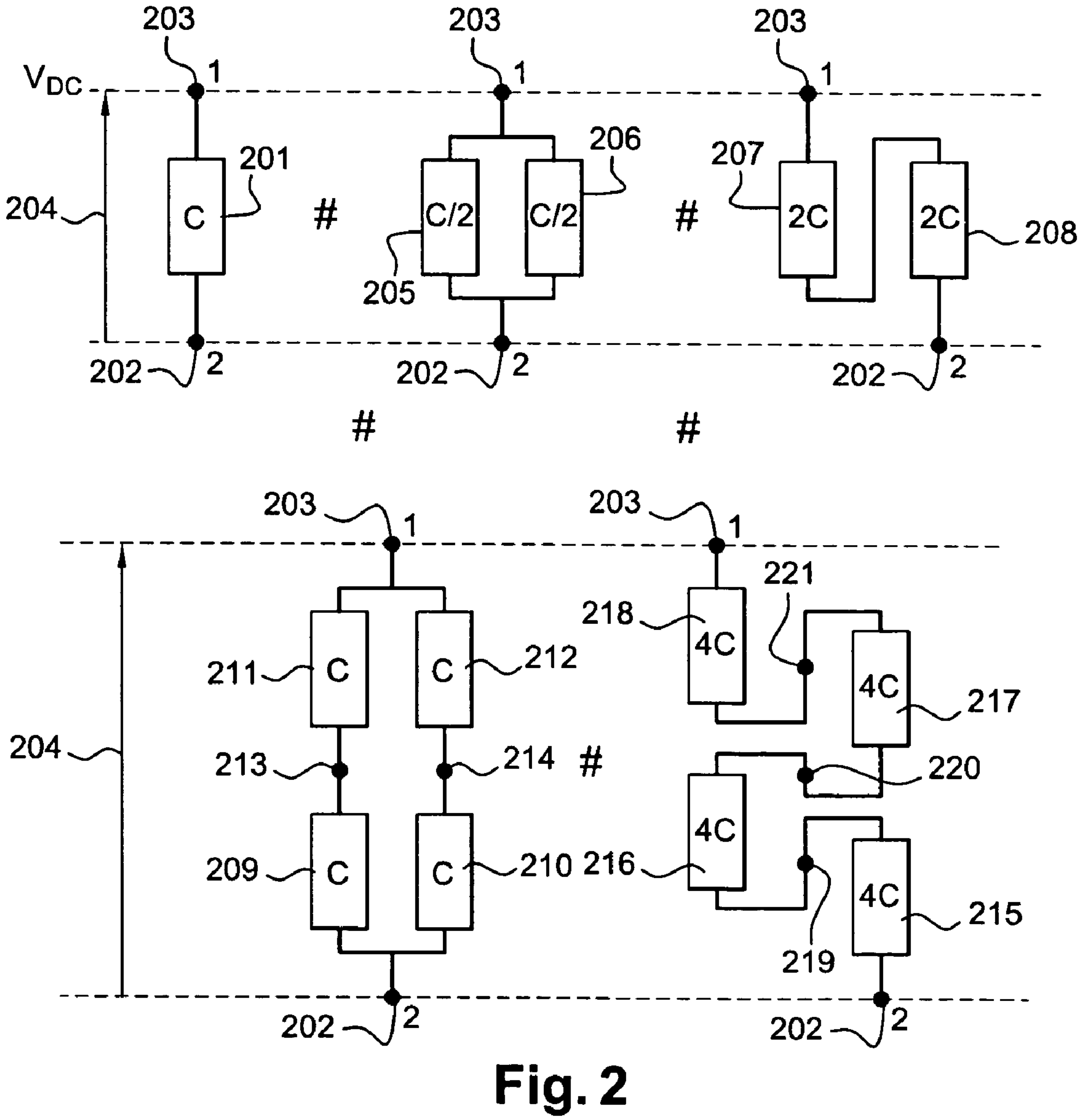
FIG. 2 illustrates equivalent capacitive elements and their positioning on an electrical circuit.

FIG. 2 shows different arrangements of equivalent capacitive elements (that can also be called capacitors) that may be used to form two parallel planes producing an electrical field favorable to the implantation of the bleeder (the measuring resistor). A capacitor 201 of the FIG. 2 has two terminals/poles 202 and 203 that enable it to be inserted into an electrical circuit. Between these terminals, there is then a capacitive effect measured in Farads or fractions of Farads. In the example of FIG. 2, the capacitor 201 has a value of C Farad (F). When the capacitor 201 is placed in a circuit and when this circuit is powered, then between the terminals 202 and 203 there is a potential or voltage difference 204. A high-voltage device has several capacitors. A capacitor is a dipole and therefore has two terminals/ends/poles. Each point of an electrical circuit, corresponding to a pole of a component, has a potential referenced Vpoint.

FIG. 2 also shows a second assembly in which, between the terminals 202 and 203, the capacitor 201 is replaced by two parallel-connected capacitors 205 and 206. The capacitors 205 and 206 have a value of C/2 F. The capacitors 205 and 206 thus mounted are then equivalent to the capacitor 201. Furthermore, a space is thus defined between the capacitors 205 and 206 in which it is possible to place other components, such as a measuring resistor for example. The capacitor 201 is again equivalent to a third assembly comprising two series-connected capacitors 207 and 208. The capacitors 207 and 208 then each have a value of 2C F so that the capacitance, as perceived at the terminals 202 and 203, is equal to C F. The capacitors 207 and 208 are then placed in parallel to as to mutually define a space in which other components can be placed.

So as to truly define two planes, other equivalent assemblies are used for the capacitor 201. FIG. 2 shows a fourth assembly comprising two capacitors 209 and 210, each having a first terminal connected to the terminal 202. The second terminal of the capacitor 209 is connected to a first terminal of a capacitor 211. The second terminal of the capacitor 210 is connected to a second terminal of the capacitor 212. The second terminals of the capacitors 211 and 212 are connected to the terminal 203. The capacitors 209 to 212 have a value C. The assembly thus obtained is equivalent to the capacitor 201. With this assembly, the capacitors 209 and 211 define a first plane. The capacitors 210 and 212 are then positioned in such a way that they define a second plane parallel to the first plane. In the second game, the capacitors 210 and 212 respectively are placed facing the capacitor 209 and 211 respectively. It is assumed that the capacitor 210 is facing the capacitor 209 if a straight line passing through the capacitor 209 and perpendicular to the first plane also passes through the capacitor 210.

In the case of the fourth assembly, there are two points 213 and 214 respectively, located between the capacitors 209 and 211 and respectively between the capacitors 210 and 212. The points 213 and 214 are at an identical potential, intermediate between the potential of the poles 202 and 203. Along the first and second planes, a progressive variation of the potential is then observed. In the present case, this progressive variation is a gradual and continuous growth. Indeed, there is a passage from the potential V202 to the potential V203 through the potential V213 of the point 213. This progressive growth can be increased by multiplying the capacitors in each of the arms. Thus, the capacitors 209 and 211 can be replaced by three capacitors, each having a value of 3/2C F. In the same way, the capacitors 210 and 212 are replaced. Then two planes are obtained, each comprising three capacitors. The two planes then also each comprise two intermediate points, one intermediate point being located between two successive capacitors. In this case, there is a passage from the potential V202 of the point 202 to the potential V203 of the point 203 via two intermediary potentials. If four series-connected capacitors are used, then there will be three intermediate potentials and so on and so forth with the increase in the number of capacitors. The larger the number of intermediate points, the more continuous will be the electrical field existing between the first and second planes, and therefore the more likely is this field to shelter a bleeder in optimizing the working of this bleeder by insulation relative to a ground potential.

In the case of the fourth assembly, all the capacitors belonging to a same arm of a branch circuit are in the same plane. The fact of using identical capacitors brings uniformity to the progressive variation of the field between the two planes. The fact of using identical capacitors means that the potential difference between two successive points of a branch circuit is constant. In other words, we have (V203−V213)=(V213−V202).

FIG. 2 shows a fifth assembly equivalent to the capacitor 201 in which there are four series-connected capacitors 215 to 218. Each capacitor 215 to 218 has a value of 4C F. The first terminal of the capacitor 215 is connected to the terminal 202. The second terminal of the capacitor 215 is connected to the first terminal of the capacitor 216 whose second terminal is connected to the first terminal of the capacitor 217. The second terminal of the capacitor 217 is connected to the first terminal of the capacitor 218 whose second terminal is connected to the terminal 203. Thus three intermediate points 219, 220 and 221 are defined. These three intermediate points are located respectively between the capacitors 215-216, 216-217 and 217-218. If we consider that V202 is a ground potential and that V203>V202, then we obtain V203>V221>V220>V219>V202. Inasmuch as the capacitors 215 to 218 have equal values, the differences between the above-mentioned potentials are identical. In other words, we have (V203−V221)=(V221−V 220)=(V220−V219)=(V219−V202).

The capacitors 216 and 218 are aligned so as to define a first plane. The capacitors 215 and 217 are aligned so as to define a second plane parallel to the first one. The capacitor 216 is located in the first plane so that it is facing the space existing between the capacitors 215 and 217. The capacitor 217 is located in the second plane facing the space existing between the capacitors 216 and 218. This assembly makes it possible to bring the points 219 to 221 closer together while staggering them along an axis going from the points 202 to 203. This assembly therefore makes it possible to obtain a field that will be far more continuous then would be the case if the capacitors were facing each other. The continuity and uniformity of the field are also reinforced by the fact that the differences in potential between two successive points are identical.

In the fifth assembly, it is possible to increase the number of series-connected capacitors between the points 202 and 203. In this case, a capacitor is never in the same plane as the two capacitors, or the capacitor, to which it is connected. The increase in the number of capacitors increases the progressive variation of the field existing between the first and second planes.

Figure 3:
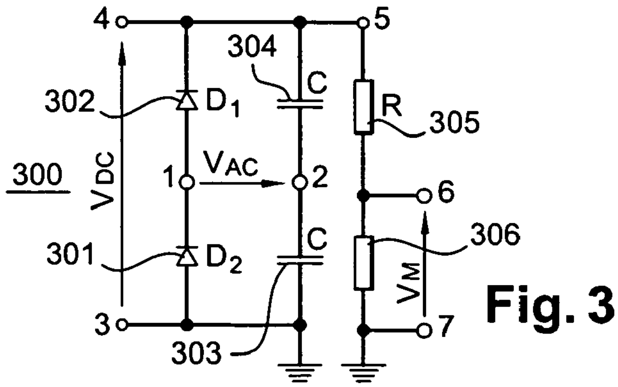
FIG. 3 is a schematic diagram of a doubler circuit according to an embodiment of the invention.

FIG. 3 illustrates a doubler assembly 300 used to produce a high-voltage. The assembly 300 enables the production of a dc high voltage $V_{DC}$, by the application of an alternating high-voltage $V_{AC}$ at its input, between the points/terminals 1 and 2. This dc high voltage $V_{DC}$ is produced at its output, indicated by the two terminals 3 and 4. The assemblies presented from FIG. 3 to FIG. 20 accept an alternating voltage $V_{AC}$ at input and produce a high voltage at output. The schematic drawings of these assemblies are known.

In an embodiment of the invention, an efficient measurement is made, at output, of a high-voltage device by using a measuring resistor that is plunged into an electrical field that varies in the same way as the voltage at the terminal of said resistor.

FIG. 3 shows a diode 301 whose anode is connected to a point 3 of the assembly 300. The cathode of the diode 301 is connected to the point 1 of the assembly 300 and to the anode of a diode 302. The cathode of the diode 302 is connected to the point 4 of the assembly 300. A capacitor 303 is connected by its first pole to the point 3 and by its second pole to the first pole of a capacitor 304. The second pole of the capacitor 303 corresponds to a point 2 of the assembly 300. The second pole of the capacitor 304 is connected to the point 4 of the assembly 300. The point 4 of the assembly 300 is electrically equivalent to a point 5 to which the first pole of a measuring resistor 305 or bleeder 305 is connected. By connecting a resistor 306 between the second pole (point 6) of the bleeder 305 and a point 7 electrically equivalent to the point 3, a voltage divider is made. It is then possible to measure a voltage $V_M$ at the terminals of the resistor 306. $V_M$ is proportional, in the ratio of the voltage divider, to the high-voltage $V_{DC}$ produced by the assembly 300 and available between the points 3 and 4. The capacitors 303 and 304 have a value of C F, and the resistor 305 has a value of R Ohms (Ω).

Figure 4:
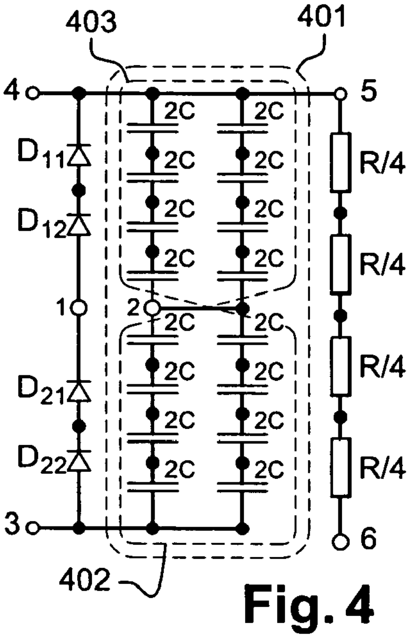
FIG. 4 is an electrical diagram of a doubler circuit according to an embodiment of the invention using discrete resistive elements.

FIG. 4 illustrates a transposition by an electrical diagram of a schematic drawing of FIG. 3. This transposition takes into account an embodiment of the invention. FIG. 4 thus shows that the capacitors 303 and 304 are actually implanted in an equivalent assembly 401 comprising two series-connected branch circuits 402 and 403. The branch circuit 402 has two arms whose ends are connected. Each arm comprises four series-connected capacitors with a value 2C F. The branch circuit 403 is identical to the branch circuit 402.

In the diagram of FIG. 4 each of the diodes 301 and 302 is formed by two diodes. In FIG. 4, the bleeder 305 is formed by four series-connected resistors. Each resistor than has a value of R/4Ω.

Figure 5:
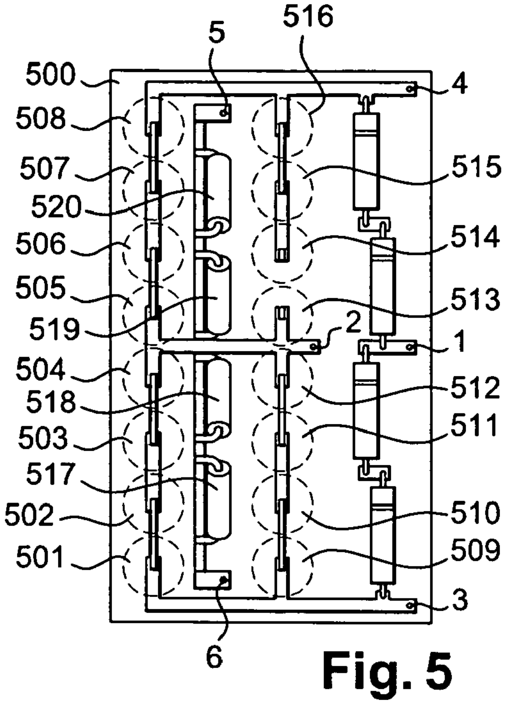
FIG. 5 is a diagram of the placing and wiring of the components (the routing of the printed circuit) of a doubler circuit according to an embodiment of the invention using discrete resistive elements.

FIG. 5 is a drawing of a circuit achieving the assembly of FIG. 4. There is a passage from the drawing of FIG. 4 to the drawing of FIG. 5 by a routing process. The routing process comprises defining the position of each component as a function of its space requirement and of the components to which the component is connected. FIG. 5 is considered to be a top view of the circuit 500 embodying the drawing of FIG. 4. Generally, in the present description, the result of the routing is shown in a top view of a circuit.

FIG. 5 shows a first row comprising eight capacitors 501 to 508, aligned in a first plane. Each capacitor is a cylindrical component whose axis is perpendicular to the plane of the circuit 500. The capacitors 501 to 508 are series-connected. The capacitors 501 to 504 correspond to the first arm of the branch circuit 402. The capacitors 505 to 508 correspond to the first arm of the branch circuit 403. The point 2 of the assembly of FIG. 300 then corresponds to the connection between the capacitors 504 and 505.

FIG. 5 shows a second row comprising eight capacitors 509 to 516, aligned in a second plane. Each capacitor 509 to 516 is a cylindrical component whose axis is perpendicular to the plane of the circuit 500. The capacitors 509 to 516 are series-connected. The capacitors 509 to 512 correspond to the second arm of the branch circuit 402. The capacitors 513 to the 516 corresponds the second arm on the branch circuit 403. The point 2 of the assembly of the FIG. 300 then corresponds to the connection between the capacitors 512 and 513.

The first and second planes defined in FIG. 5 are parallel. In these planes, the capacitor 501 faces a capacitor 509, the capacitor 502 faces a capacitor 510, and so on and so forth until the pair formed by the capacitors 508 and 516. The capacitors 501 and 509 are also connected to the point 3. The capacitors 508 and 516 are also connected to the point 4. With this assembly, along the first and second planes, there is a passage from the potential of the point 3 to the potential of the point 4 via seven intermediate potentials. Each intermediate potential corresponds to an inter-capacitor connection. If we consider a point on the first plane, then the facing point in the second plane has substantially the same potential.

The first and second planes are spaced out by distances of some millimeters to some tens of millimeters depending on the space requirement of the bleeder. FIG. 5 shows the bleeder 305 formed by four resistive components 517 to 520. The components 517 to 520 are series-connected between points 5 and 6 of the circuit 500. The components 517 to 520 extend throughout the length defined by the capacitors 501 to 508. The components 517 to 520 are located between the first and second planes. In practice the capacitors 501 to 508 and 509 to 516 define walls of a parallelepiped in which the bleeder 305 is placed.

FIG. 5 shows that the point 5 is not connected to the point 4. This is useful if it is planned to connect the circuit 500 to a circuit 500' identical to the circuit 500. In this case, the point 5 is then connected to the point 6' and the point 4 to the point 3'. If no other circuit is used, or if the circuit is the last of a chain of circuits of the type similar to the circuit 500, then the point 5 is connected to the point 4.

FIG. 5 also illustrates the positioning of the diodes useful for the assemblies. The electrical connections between the components are made via tracks or wires according to known methods, and according to the connection plane defined by the electrical drawing from which the routing is obtained.

Figure 6:
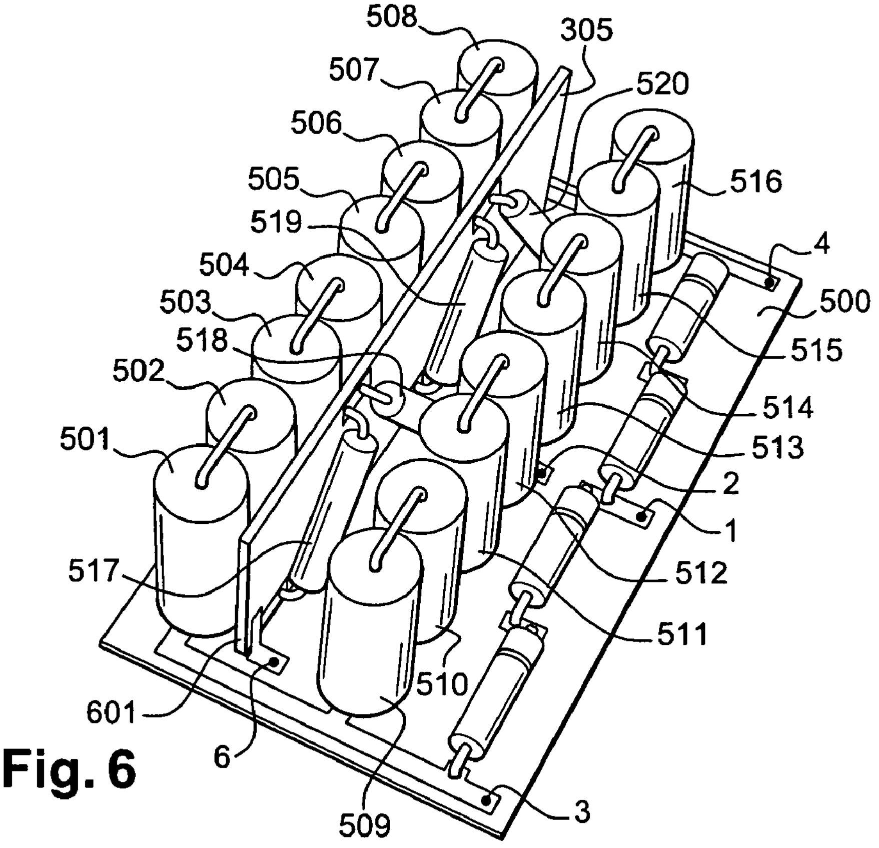
FIG. 6 is a perspective view of a doubler circuit according to an embodiment of the invention using discrete resistive elements.

FIG. 6 is a three-dimensional view of the wired circuit of FIG. 5. Identical references for FIGS. 3 to 12 refer to identical elements. FIG. 6 shows that the bleeder 305 is made via a circuit 601 to which the resistors 517 to 520 are connected in series. In the circuit 601 two successive resistors, namely resistors directly connected to each other, form a triangle. This triangular assembly enables the most efficient possible occupation of the space demarcated by the walls. Of these walls, the first is formed by the capacitors 501 to 508 and the second is formed by the capacitors 509 to 516. Thus the resistors 517 and 518 form a triangle whose base is parallel to the plane of the circuit 500, and whose height is substantially equal to the length of one of the capacitors 501 to 516. The chain of the resistive elements of the bleeder 305 thus forms a sawtooth extending along the height of the above-mentioned capacitor, and on the length defined by the total space occupied by the capacitors 501 to 508. In practice, and whatever the embodiment, the bleeder occupies only the space defined by the two planes.

It is possible to make a bleeder with a different number of resistive elements, whether this number is greater or smaller than four.

Figure 7:
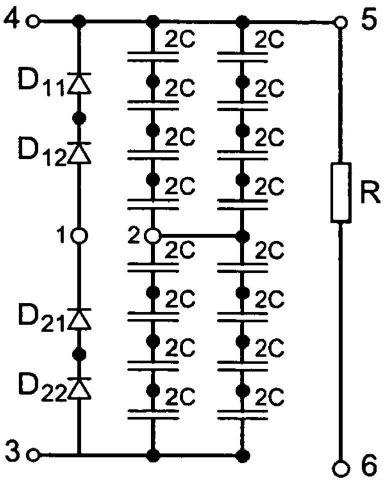
FIG. 7 is an electrical diagram of a doubler circuit according to an embodiment of the invention using a screen-printed resistive element.

FIG. 7 illustrates the embodiment of the assembly of FIG. 3. FIG. 7 is substantially identical to FIG. 4 except for the bleeder, namely with respect to the resistor connected between points 5 and 6 of the assembly. In the case of FIG. 7, this is a single resistive element. This resistive element is a screen-printed resistor, namely a circuit on which a pattern is etched/printed. This pattern is made by means of resistive conductive tracks. The resistance measured at the end/terminals of the pattern is then equal to RΩ.

Figure 8:
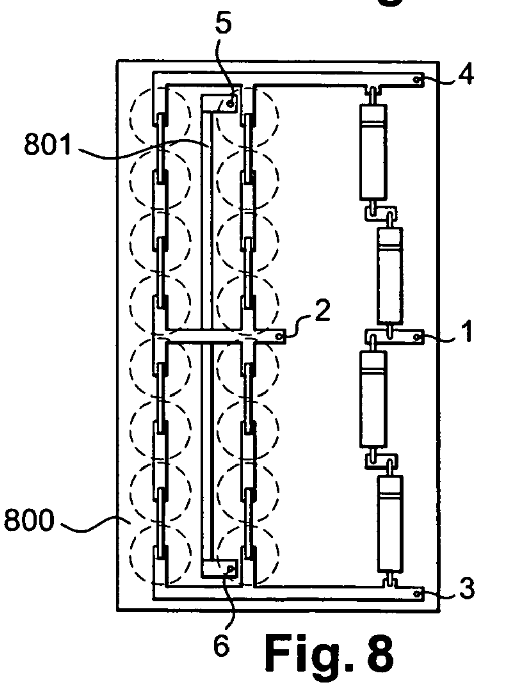
FIG. 8 is a diagram of the positioning and wiring of the components (the routing of the printed circuit) of a doubler circuit according to an embodiment of the invention using a screen-printed resistive element.

FIG. 8 is substantially identical to FIG. 5, except with respect to the bleeder connected between points 5 and 6. Identical references therefore refer to identical elements. FIG. 8 is the result of the routing of the assembly of FIG. 7, namely a printed circuit 800. FIG. 8 shows that, between the points 5 and 6, there is connected a circuit 801 on which a pattern is screen-printed with a resistance of RΩ. The plane defined by the circuit 801 is perpendicular to the plane defined by the circuit 800.

Figure 9:
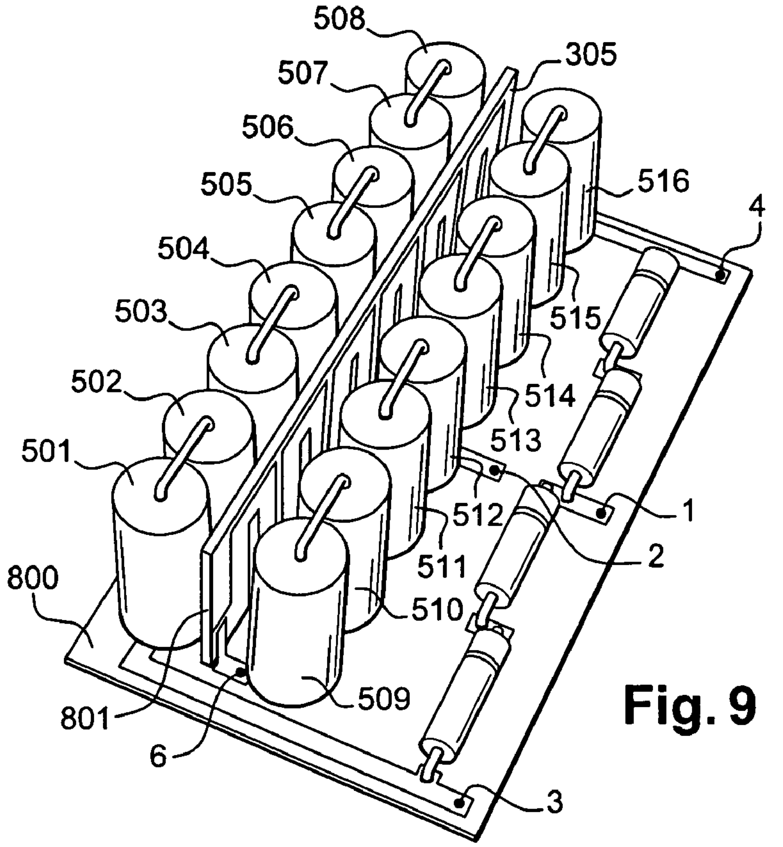
FIG. 9 is a perspective view of a doubler circuit according to an embodiment of the invention using a screen-printed resistive element.

FIG. 9 is substantially identical to FIG. 6, except with respect to the bleeder. Identical references therefore refer to identical elements. FIG. 9 is a three-dimensional view of the circuit 800 to which the components have been wired. FIG. 9 thus shows the circuit 801 between the first plane defined firstly by the capacitors 501 to 508, and the second plane defined by the capacitors 509 to 516. The surface of the circuit 801 is then substantially equal to the surface defined by the capacitors 501 to 508 in a plane parallel to the circuit 801. The pattern screen-printed on the circuit 101 is for example crenellated. However, it could also be a saw-toothed pattern, a sinusoidal pattern, a straight line or any other pattern.

FIG. 9 illustrates the smaller the space taken up by the means used to make the bleeder; the closer is it possible to approach the first and second planes, and therefore the smaller the space taken up by a high-voltage production device according to an embodiment of the invention. Thus, the use of the screen-printed resistor saves space because a printed circuit with screen-printing is less thick than a printed circuit on which components are soldered.

Figure 10:
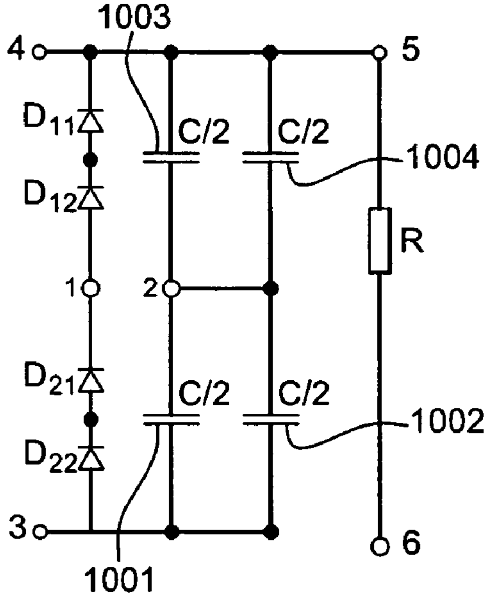
FIG. 10 is an electrical diagram of a doubler circuit according to an embodiment of the invention using a screen-printed resistive element and lengthwise capacitive elements.

FIG. 10 is an electrical diagram equivalent to the assembly of FIG. 3. The diagram of FIG. 10 uses a screen-printed resistor to make the bleeder 305 and a lengthwise capacitor for each of the arms of the branch circuits 402 and 403. Each of these capacitors then has a value of C/2 F. FIG. 10 therefore then shows that the point 3 is connected to the first terminals of the capacitors 1001 and 1002. The second poles of the capacitors 1001 and 1002 are connected to the point 2. The first poles of the capacitors 1003 and 1004 are connected to the point 2, while their second poles are connected to the point 4.

Figure 11:
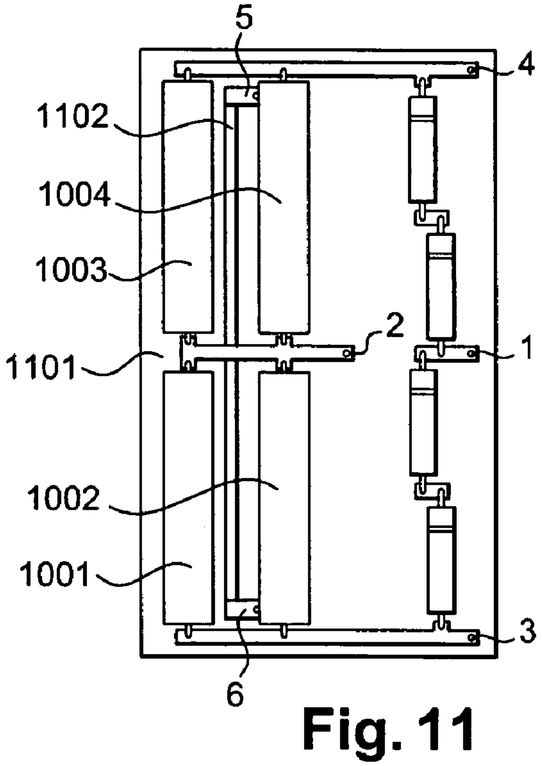
FIG. 11 is a diagram of the positioning and wiring of the components (the routing of the printed circuit) of a doubler circuit according to an embodiment of the invention using a screen-printed resistive element and lengthwise capacitive elements.

FIG. 11 is the result of the routing of the electrical diagram of FIG. 10. Identical elements therefore have identical references. FIG. 11 shows that the capacitors 1001 to 1004 are connected to a circuit 1101 in such a way that their biggest dimension (their length) and their smallest dimension (their width) are parallel to the plane of the circuit 1101. The capacitors 1001 and 1003 furthermore belong to a same first plane perpendicular to the plane of the circuit 1101. The capacitors 1002 and 1004 belong to a second plane parallel to the first plane. Between these first and second planes, a circuit 1102 is positioned and connected between the points 5 and 6. This circuit 1102 is a screen-printed resistor with a value RΩ. To comply with the principle of the invention, the capacitors must be made in such a way that the internal voltage develops progressively along their axis as if they were constituted by smaller elementary capacitors series-connected along the axis.

Figure 12:
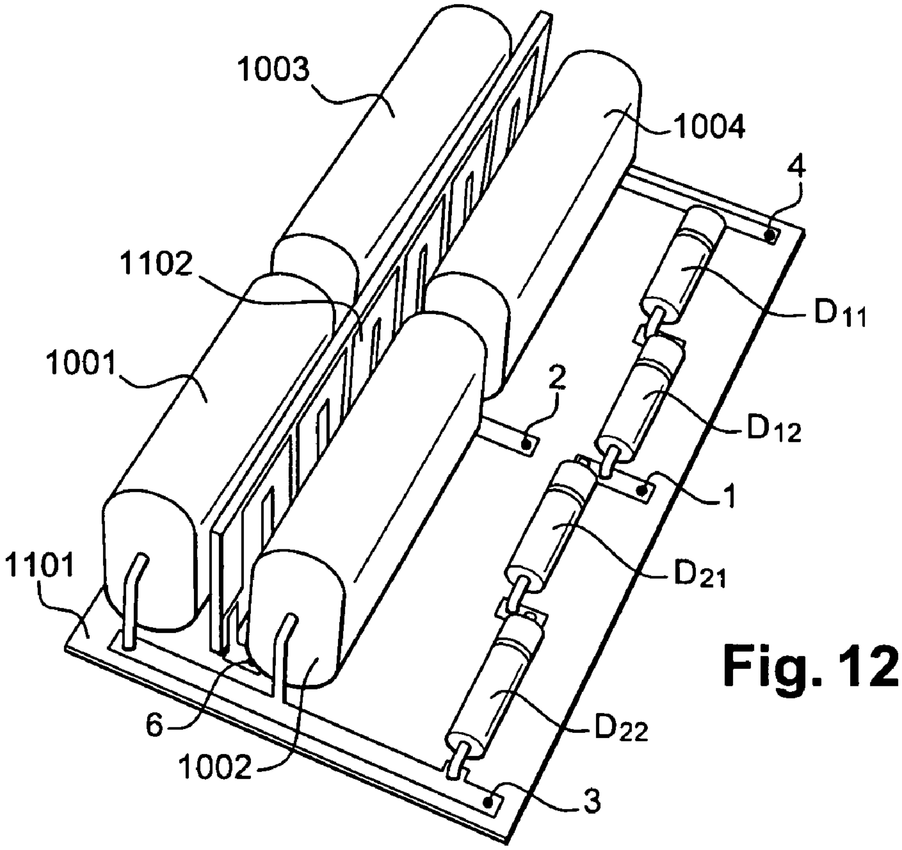
FIG. 12 is a perspective view of a doubler circuit according to an embodiment of the invention using a screen-printed resistive element and lengthwise capacitive elements.

FIG. 12 is a view in space of the circuit of FIG. 11 to which components have been soldered. Identical references therefore correspond to identical elements.

Figure 13:
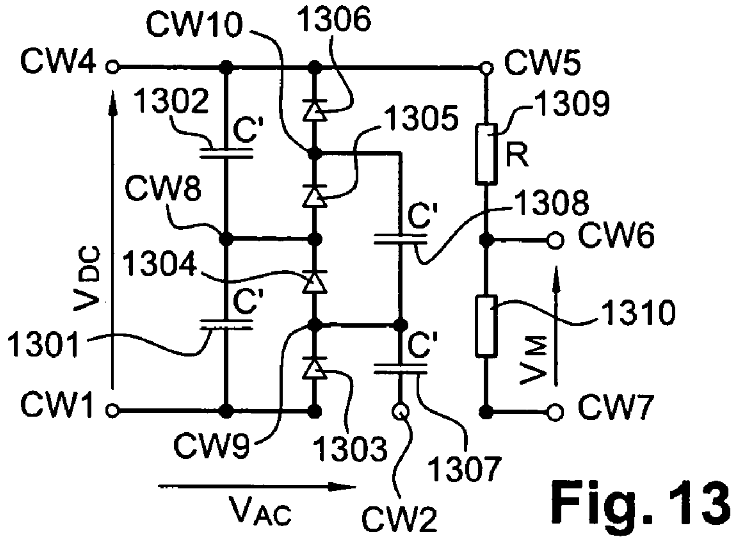
FIG. 13 is a schematic drawing of a Crockcroft-Walton multiplier circuit according to an embodiment of the invention.

FIG. 13 is a drawing showing the principle of a multiplier assembly with four multiplier stages of the Crockcroft and Walton type. Such an assembly is well known. Everything that follows is described with four stages but is applicable regardless of the number of multiplier stages. FIGS. 13 to 16 illustrate the same assembly and identical references in these drawings correspond to identical elements. FIG. 13 shows the capacitor 1301 connected by one of its poles to a point CW1. The other pole of the capacitor 1301 is connected to the point CW8. The capacitor 1302 is connected by a pole to the point CW8, and by the other pole to a point CW4. The anode of a diode 1303 is connected to the point CW1. The cathode of the diode 1303 is connected to a point CW9. The anode of a diode 1304 is connected to the point CW9. The cathode, of the diode 1304 is connected to the point CW8. The anode of a diode 1305 is connected to the point CW8. The cathode of the diode 1305 is connected to a point CW10. The anode of the diode 1306 is connected to the point CW10. The cathode of the diode 1306 is connected to the point CW4. A capacitor 1307 is connected by a pole to a point CW2 and by the other pole to the point CW9. The capacitor 1308 is connected by a pole to the point CW9 and by the other pole to the point CW10. The bleeder 1309 is connected firstly to a point CW5 electrically equivalent to the point CW4, and secondly to a point CW6.

The capacitors 1301, 1302, 1207 and 1308 have a value of C' F. The bleeder 1309 has a value of RΩ. FIG. 13 also shows that a resistor 1310 is connected between the point CW6 and a point CW7 electrically equivalent to the point CW1. A voltage $V_M$ can thus be measured at the terminals of the resistor 1310, $V_M$ being proportional to the high voltage produced by the assembly of FIG. 13 in a ratio of the voltage divider formed by the bleeder 1309 and the resistor 1310. For the assembly of FIG. 13, an alternating input voltage is applied between the points CW1 and CW2, and a dc high voltage is recovered between the points CW1 and CW4.

Figure 14:
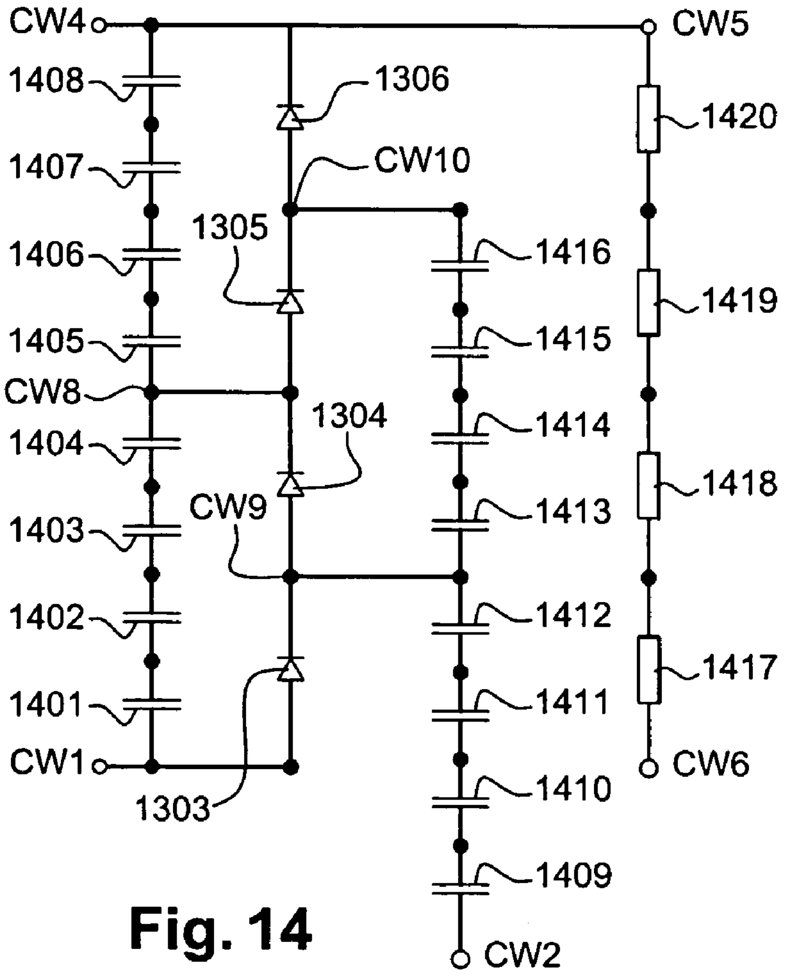
FIG. 14 is an electrical diagram of a Crockcroft-Walton multiplier circuit according to an embodiment of the invention using discrete resistive elements.

FIG. 14 illustrates an electrical diagram that is substantially equivalent to the assembly of FIG. 13 except for the resistor 1310. FIG. 14 shows that each capacitor 1301, 1302, 1307 and 1308 has been replaced by a chain of series-connected capacitors. Thus, the capacitor 1301 is replaced by series-connected capacitors 1401 to 1404. The capacitor 1302 is replaced by series-connected capacitors 1405 to 1408. The capacitor 1307 is replaced by series-connected capacitors 1409 to 1412. The capacitor 1308 is replaced by series-connected capacitors 1413 to 1416. The capacitors 1401 to 1416 are identical and have a value of 4C' F. The bleeder 1309 is made by means of circuit identical to the circuit 601 comprising several series-connected resistive elements of the circuit. Thus the bleeder 1309 comprises series-connected resistors 1417 to 1420.

Figure 15:
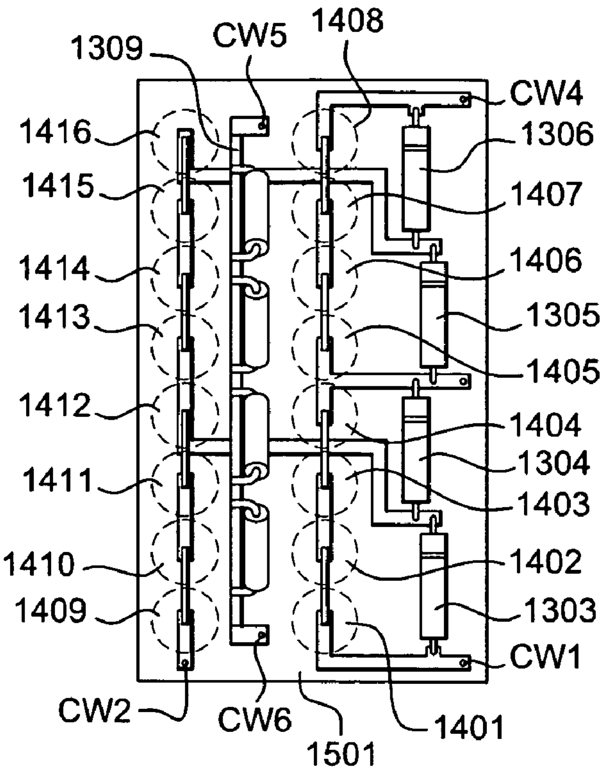
FIG. 15 is a diagram of the positioning and wiring of the components (the routing of the printed circuit) of a Crockcroft-Walton multiplier circuit according to an embodiment of the invention using discrete resistive elements.

FIG. 15 shows the result of the routing of the electrical diagram of FIG. 14. The capacitors 1401 to 1416 are cylindrical capacitors whose axes are perpendicular to a plane of the circuit 1501. The capacitors 1409 to 1416 are aligned in a first plane perpendicular to the plane of the circuit 1501. The capacitors 1401 to 1408 are aligned in a second plane parallel to the first plane. The capacitor 1409 faces a capacitor 1401. The capacitor 1410 faces a capacitor 1402, and so on and so forth until the pair formed by the capacitors 1416 and 1408. The capacitors thus arranged define walls of a parallelepiped within which the bleeder 1309 is placed. The effect on the bleeder and the voltage at its terminals are then the same as that described for the doubler assembly. In the same way as in the case of the doubler assembly, the number of capacitors can be increased in order to improve the progressive variation of the field along the first and second planes.

In practice, the points CW5 and CW4 are connected. However, if it is desired to connect several circuits of the type shown in FIG. 5, then the point CW5 is connected to the point CW6' in order to ensure the continuity of the bleeder between the two circuits. Thus the point CW5 is connected to the point CW4 only if the circuit is used alone, or if the circuit is the last of a chain of circuits such as the circuit of FIG. 15.

Figure 16:
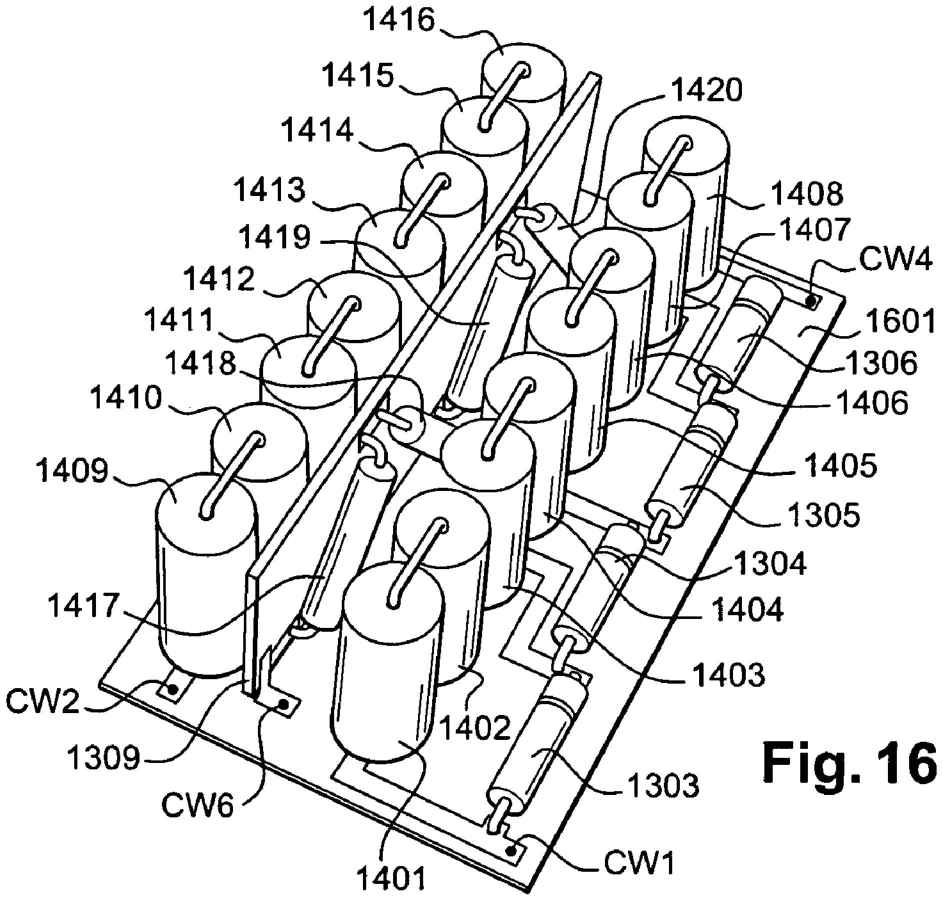
FIG. 16 is a perspective view of a Crockcroft-Walton multiplier circuit according to an embodiment the invention using discrete resistive elements.

FIG. 16 is a three-dimensional view of the circuit of FIG. 15 to which components have been soldered. FIG. 16 clearly shows the bleeder 1309 placed between two rows of capacitors forming two perpendicular planes parallel to the plane of the circuit 1601. FIG. 16 is identical, from the viewpoint of the spatial arrangement of the components, to FIGS. 6 and 9. What differentiates FIG. 16 from FIGS. 6 and 9 are the connections, tracks and wires between the components that, for FIG. 16, correspond to the electrical drawing of FIG. 14.

Figure 17:
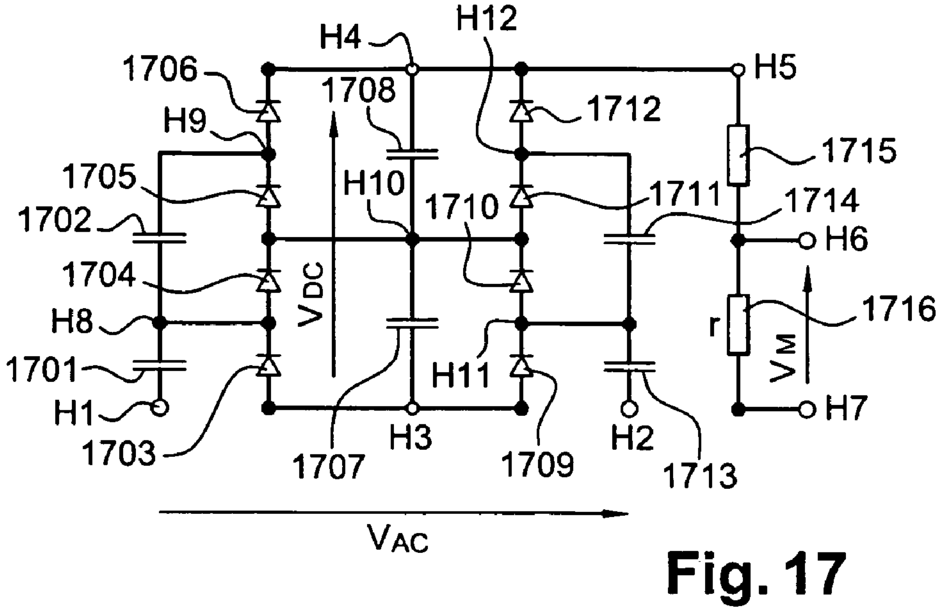
FIG. 17 is a schematic drawing of a Heafely multiplier circuit according to an embodiment of the invention.

FIG. 17 is a schematic drawing of another multiplier assembly with four Heafely type stages. Such an assembly is well known. The following description is made with reference to four stages but is applicable whatever their number of multiplier stages. FIGS. 17 to 20 illustrate the same assembly, and identical references in these drawings correspond to identical elements.

FIG. 17 shows a capacitor 1701 connected by one of its poles to a point H1 and by its other pole to a point H8. A capacitor 1702 is connected by one of its poles to the point H8, and by its other pole to a point H9. A diode 1703 is connected by its anode to a point H3 and by its cathode to the point H8. A diode 1704 is connected by the anode to the point H8 and by the cathode to a point H10. A diode 1705 is connected by its anode to the point H10 and by its cathode to the point H9. A diode 1703 is connected by its anode to a point H3 and by its cathode to the point H8. A diode 1706 is connected by its anode to the point H9 and by its cathode to a point H4. A capacitor 1707 is connected by one of its poles to the point H3, and by the other pole to the point H10. A capacitor 1708 is connected by one of its poles to the point H10, and by its other pole to the point H4. A diode 1709 is connected by its anode to the point H3 and by its cathode to a point H11. The diode 1710 is connected by its anode to the point H11 and by its cathode to the point H10. A diode 1711 is connected by its anode to the point H8 and by its cathode to the point H10. A diode 1711 is connected by its anode to the point H10 and by its cathode to a point H12. A diode 1713 is connected by its anode to the point H12 and by its cathode to the point H4. A capacitor 1713 is connected by one of its poles to a point H2, and by its other pole to the point H11. A capacitor 1714 is connected by one of its poles to the point H11, and by its other pole to the point H12. A bleeder is connected between points H5 and H6, the point H5 being electrically equivalent in FIG. 17 to the point H4. The capacitors of FIG. 17 have a value=2C" F. The bleeder 1715 has a value of RΩ.

FIG. 17 also shows that the resistor 1716 is connected between the point H6 and a point H7 electrically equivalent to the point H1. A voltage $V_M$ can thus be measured at the terminals of the resistor 1716, $V_M$ being proportional to the high voltage produced by the assembly of FIG. 17 in a ratio of the voltage divider formed by the bleeder 1715 and the resistor 1716. For the assembly of FIG. 17, an alternating input voltage is applied between the points H1 and H2, and a dc high voltage is recovered between the points H3 and H4.

Figure 18:
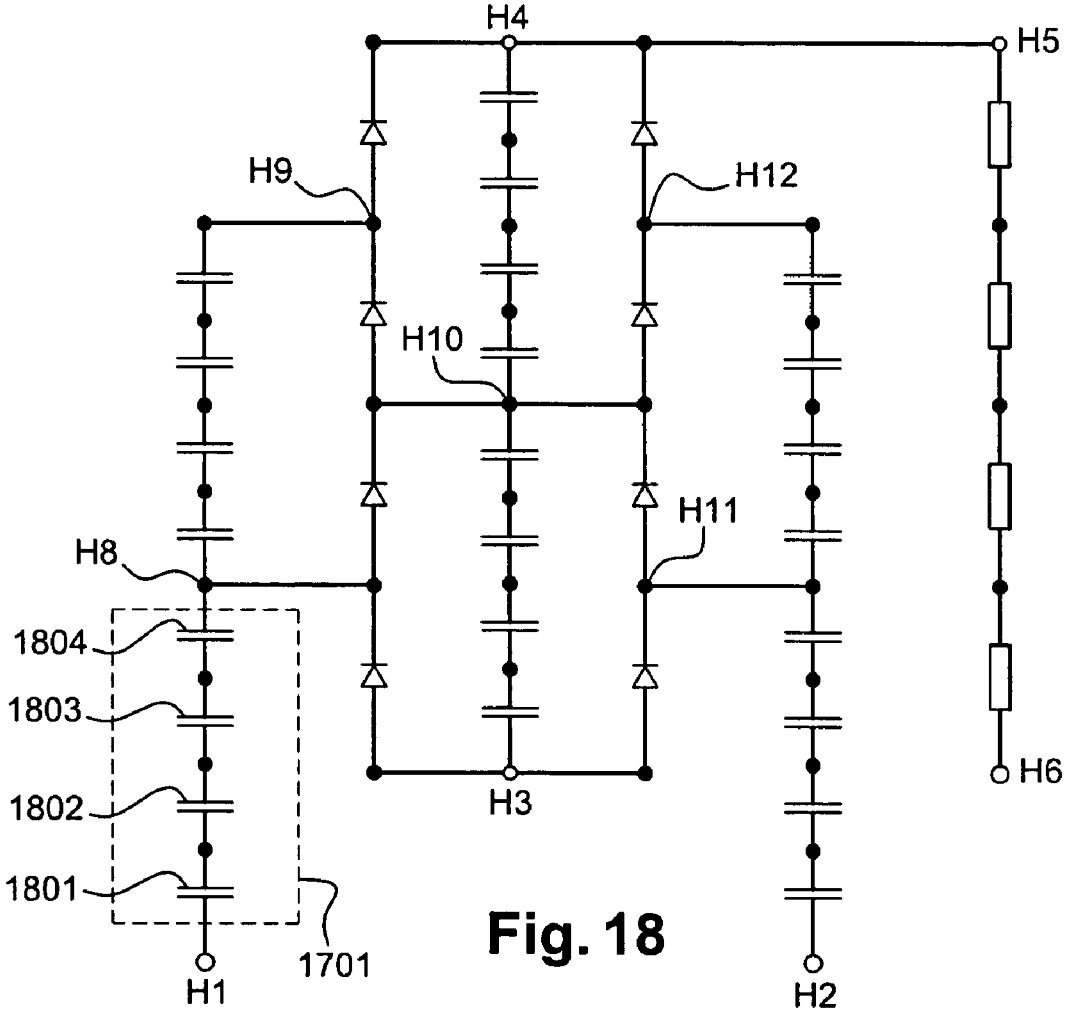
FIG. 18 is an electrical diagram of a Heafely multiplier circuit according to an embodiment of the invention using discrete resistive elements.

FIG. 18 is an electrical diagram equivalent to the assembly of FIG. 17 except for the resistor 1716. FIG. 18 illustrates that each capacitor of FIG. 17 is formed by an assembly of four series-connected capacitors. Thus, the capacitor 1701 is formed by series-connected capacitors

1801 to 1804. Each of the capacitors 1801 to 1804 then has a value of 4C" F. The same procedure is used for all the capacitors of FIG. 17.

FIG. 18 also illustrates the fact that the bleeder is made by using discrete resistive elements, namely four resistors with the value R/4Ω, as for FIG. 4.

Figure 19:
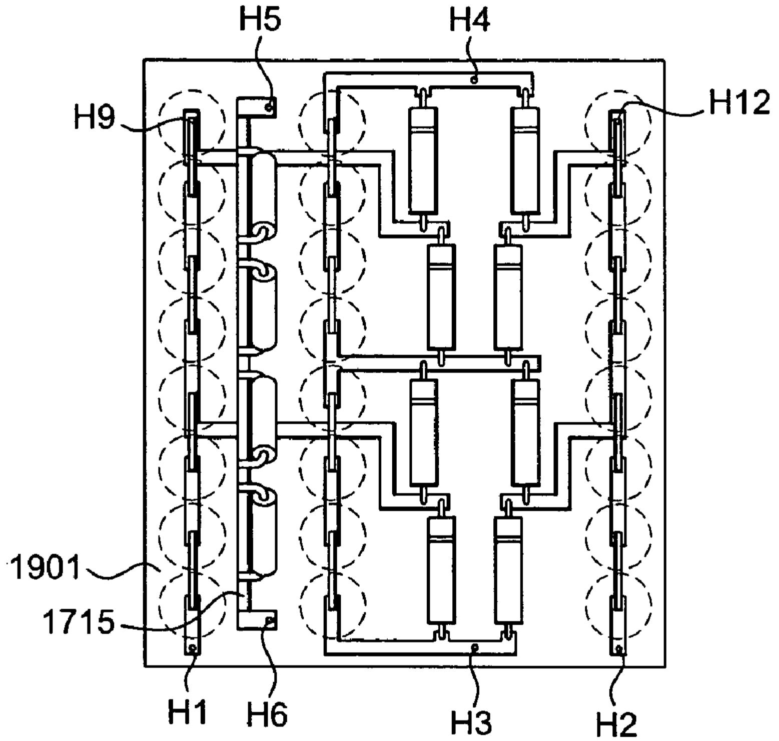
FIG. 19 is a diagram of the positioning and wiring of the components (the routing of the printed circuit) of a Heafely multiplier circuit according to an embodiment of the invention using discrete resistive elements.

FIG. 19 is the result of the routing of the electrical diagram of FIG. 18. FIG. 19 shows that cylindrical capacitors are used, enabling the definition of the planes parallel and perpendicular to the plane of a circuit 1901 in which there are laid out the components corresponding to FIG. 18. The axis of the capacitors is perpendicular to the plane of the circuit 1901. Capacitors corresponding to the making of the capacitors 1701 and 1702 are used to define the first plane. This therefore represents eight capacitors between the points H1 and H9. An embodiment of the invention uses capacitors corresponding to the making of the capacitors 1707 and 1708 to define a second plane parallel to the first one. This therefore represents eight capacitors between the points H3 and H4. These two planes define a space in which the bleeder 1715 connected between the points H5 and H6 is placed. The point H5 is not connected, in FIG. 19, to the point H4. In practice, the circuit of FIG. 19 may be placed in a chain with other circuits of the same type. If the circuit of FIG. 19 is used alone, or if it is the last circuit of a chain, then the point H4 is connected to the point H5.

In one variant, the capacitors located between the points H2 and H12 can be used to create the first plane.

In another variant, the capacitors located between the points H3 and H4 are arranged as presented for the fifth assembly of FIG. 2. Then, with these capacitors equivalent to the capacitors 1707 and 1708, two planes are defined between which the bleeder 1715 is positioned.

Figure 20:
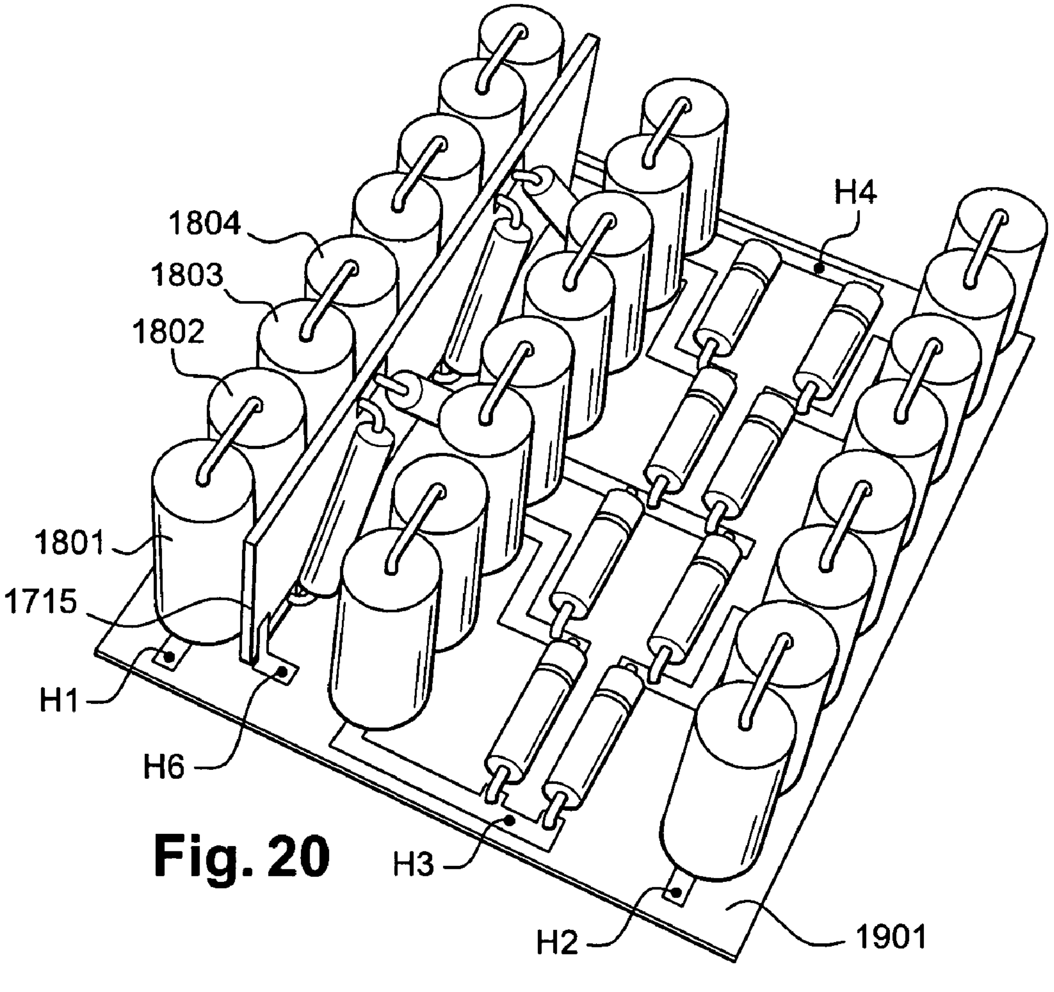
FIG. 20 is a perspective view of a Heafely multiplier circuit according to an embodiment of the invention using discrete resistive elements.

FIG. 20 is a three-dimensional view of the circuit of FIG. 17 to which components have been soldered. FIG. 20 clearly shows the bleeder 1715 placed between two rows of capacitors forming two parallel planes.

In an embodiment of the invention, the bleeder may be formed by discrete resistor-type components soldered to the high voltage production circuit, or soldered to another circuit, this other circuit for its part being soldered to the high-voltage production circuit. The bleeder may also be made through a printed circuit on which there is printed/screen-printed track having a resistor corresponding to the value of the bleeder. These embodiments of the bleeder are adapted to all topologies of high-voltage production circuits. This description illustrates the application to three topologies, namely the doubler, the Crockcroft-Walton and the Heafely topologies. However, the invention is applicable to other topologies.

If the number of capacitors in the planes is increased, the progressive variation is improved. The manner of increasing the number of capacitors on the basis of a value to be obtained is illustrated in FIG. 2. Increasing the number of capacitors is not detrimental in terms of space requirement because the stored energy is proportional to the volume of the capacitors. Thus, several low-volume capacitors store as much energy as one high-volume capacitor.

When thus applied to the topologies taken as an example, an aperiodic response is obtained at the bleeder, and the build-up of the voltage measured perfectly follows the build-up of the voltage at the output terminals of the high-voltage generator. A classical build-up is obtained within 1 ms, and thus enables the build-up to be followed up to 160 kV that is attained in 0.4 ms.

In practice, the space requirement of the circuit according to an embodiment of the invention corresponds, for a first dimension, to the space requirement of the capacitors defining the first and second plane, in height by the height of the capacitors used, and in the other dimension to the topology used and to the bleeder used.

A circuit according to an embodiment of the invention is generally used immersed in an oil bath.

In an embodiment of the invention, a high voltage is therefore produced through a device comprising one or more capacitors and one or more high-voltage measuring resistors, that may or may not be mounted on a printed circuit, wherein the arrangement of these elements is such that the capacitors and the equipotentials of their connections generate an electrical field for which the progress of the potential is similar to that generated in the steady operation state by the measuring resistor alone. A typical arrangement comprises two parallel rows of capacitors between which the measuring resistor, made in the form of a plate, is placed.

In practice, current values for C, and C' are in a bracket ranging from 0.1 nF to 10 nF, depending on the application envisaged for the high-voltage device. If a high pulse frequency is required, then low capacitance values will be chosen to favor the speed of the generator relative to its precision/filtering. If a high pulse frequency is not required then high capacitance values will be chosen to favor the precision/filtering of the generator relative to its speed.

A standard value for the bleeder is in a bracket ranging from 100 to 400 mega ohms. The bleeder is then associated with a measuring resistor with a value of 10 to 40 kilo-ohms.

In practice, the diodes used have a capacity in current of 0.5 to 2 amperes, their voltage depending on the number of diodes series-connected to obtain the diode 302. In the case of the doubler, with $V_{DC}$ having a value of 210 kV to 70 kV, the diode 302 has a voltage capacity of $V_{DC}$. In the case of the multiplier, the voltage capacity of each diode is ($V_{DC}$/total number of diodes)×2,5.

An embodiment of the invention is therefore to make high-voltage generation devices more compact. An embodiment of the invention enables a precise static and dynamic, aperiodic measurement of the high voltage generated. An embodiment of the invention also does not comprise any element dedicated specifically to the shielding of the measuring resistor. In an embodiment of the invention, the measuring resistor is formed by several discrete resistive components (517-520). In an embodiment of the invention, the measuring resistor is formed by a component (801) screen-printed on a plate. In an embodiment of the invention, a capacitive assembly (201-215) is used, equivalent to the theoretical capacitances of the high-voltage production device, the capacitors of the capacitive assembly being aligned to form the at least two planes. In an embodiment of the invention, the capacitive elements are connected in such a way that the high voltage increases gradually along the at least two planes. In an embodiment of the invention, the high-voltage production device is a doubler circuit (301-1102). In an embodiment of the invention again, the high voltage device is a Crockcroft-Walton multiplier circuit (1301-1601). In an embodiment of the invention again, the high voltage production device is a Heafely multiplier circuit (1701-1901). In an embodiment of the invention, the measuring resistor is alone between the two planes.

One skilled in the art may make or propose various modifications to the structure and/or way and or function and/or result of the disclosed embodiments and equivalents thereof without departing from the scope and extant of the invention.

What is claimed is:

1. A high-voltage device comprising:

a plurality of capacitors and at least one internal resistor for the measurement of high voltage;

wherein the plurality of capacitors are aligned so as to form at least two parallel planes, where terminals corresponding to a first set of the plurality of capacitors define a first plane, and terminals corresponding to a second set of the plurality of capacitors define a second plane;

wherein the measuring resistor comprises terminals defining a third plane, the third plane disposed between and parallel to the at least two parallel planes; and wherein the first set of capacitors are electrically connected in series with each other, the second set of capacitors are electrically connected in series with each other, and the first set of capacitors are electrically connected in parallel with the second set of capacitors so as to create an electrical field surrounding the measuring resistor, the terminals of the measuring resistor being disposed proximate the terminals of the parallel arrangement of capacitors such that the electrical field has a voltage potential across the parallel arrangement of capacitors similar in value to a voltage potential across the measuring resistor that is generated during steady state operation of the measuring resistor, thereby shielding the measuring resistor from a ground potential.

2. The device according to claim 1 comprising no element dedicated specifically to the shielding of the measuring resistor.

3. The device according to claim 1 wherein the measuring resistor is formed by several discrete resistive components.

4. The device according to claim 2 wherein the measuring resistor is formed by several discrete resistive components.

5. The device according to claim 1 wherein the measuring resistor is formed by a component screen-printed on a plate.

6. The device according to claim 2 wherein the measuring resistor is formed by a component screen-printed on a plate.

7. The device according to claim 1 wherein a capacitive assembly is used, equivalent to the theoretical capacitances of the high-voltage device, the capacitors of the capacitive assembly being aligned to form the at least two parallel planes.

8. The device according to claim 2 wherein a capacitive assembly is used, equivalent to the theoretical capacitances of the high-voltage device, the capacitors of the capacitive assembly being aligned to form the at least two parallel planes.

9. The device according to claim 3 wherein a capacitive assembly is used, equivalent to the theoretical capacitances of the high-voltage device, the capacitors of the capacitive assembly being aligned to form the at least two parallel planes.

10. The device according to claim 5 wherein a capacitive assembly is used, equivalent to the theoretical capacitances of the high-voltage device, the capacitors of the capacitive assembly being aligned to form the at least two parallel planes.

11. The device according to claim 1 wherein the capacitive elements are connected in such a way that the high voltage increases gradually along the at least two parallel planes.

12. The device according to claim 2 wherein the capacitive elements are connected in such a way that the high voltage increases gradually along the at least two parallel planes.

13. The device according to claim 3 wherein the capacitive elements are connected in such a way that the high voltage increases gradually along the at least two parallel planes.

14. The device according to claim 5 wherein the capacitive elements are connected in such a way that the high voltage increases gradually along the at least two parallel planes.

15. The device according to claim 7 wherein the capacitive elements are connected in such a way that the high voltage increases gradually along the at least two parallel planes.

16. The device according to claim 1 wherein the high-voltage device is a doubler circuit.

17. The device according to claim 2 wherein the high-voltage device is a doubler circuit.

18. The device according to claim 3 wherein the high-voltage device is a doubler circuit.

19. The device according to claim 5 wherein the high-voltage device is a doubler circuit.

20. The device according to claim 7 wherein the high-voltage device is a doubler circuit.

21. The device according to claim 11 wherein the high-voltage device is a doubler circuit.

22. The device according to claim 1 wherein the high-voltage device is a Crockcroft-Walton multiplier circuit.

23. The device according to claim 2 wherein the high-voltage device is a Crockcroft-Walton multiplier circuit.

24. The device according to claim 3 wherein the high-voltage device is a Crockcroft-Walton multiplier circuit.

25. The device according to claim 5 wherein the high-voltage device is a Crockcroft-Walton multiplier circuit.

26. The device according to claim 7 wherein the high-voltage device is a Crockcroft-Walton multiplier circuit.

27. The device according to claim 11 wherein the high-voltage device is a Crockcroft-Walton multiplier circuit.

28. The device according to claim 1 wherein the high-voltage device is a Heafely multiplier circuit.

29. The device according to claim 2 wherein the high-voltage device is a Heafely multiplier circuit.

30. The device according to claim 3 wherein the high-voltage device is a Heafely multiplier circuit.

31. The device according to claim 5 wherein the high-voltage device is a Heafely multiplier circuit.

32. The device according to claim 7 wherein the high-voltage device is a Heafely multiplier circuit.

33. The device according to claim 11 wherein the high-voltage device is a Heafely multiplier circuit.

34. The device according to claim 1 wherein the measuring resistor is alone between the at least two parallel planes.

35. The device according to claim 2 wherein the measuring resistor is alone between the at least two parallel planes.

36. The device according to claim 3 wherein the measuring resistor is alone between the at least two parallel planes.

37. The device according to claim 5 wherein the measuring resistor is alone between the at least two parallel planes.

38. The device according to claim 7 wherein the measuring resistor is alone between the at least two parallel planes.

39. The device according to claim 11 wherein the measuring resistor is alone between the at least two parallel planes.

40. The device according to claim 16 wherein the measuring resistor is alone between the at least two parallel planes.

41. The device according to claim 22 wherein the measuring resistor is alone between the at least two parallel planes.

42. The device according to claim 24 wherein the measuring resistor is alone between the at least two parallel planes.

43. The device according to claim 1 wherein:

the measuring resistor comprises a body, the body being aligned with the third plane.

* * * * *